Oct. 20, 1925.

J. C. DANIEL

ROTATING ELECTRIC SIGN

Filed Sept. 10, 1924   2 Sheets-Sheet 2

1,558,243

John Clarence Daniel
INVENTOR

BY Victor J. Evans
ATTORNEY

Patented Oct. 20, 1925.

1,558,243

UNITED STATES PATENT OFFICE.

JOHN CLARENCE DANIEL, OF WINSTON-SALEM, NORTH CAROLINA.

ROTATING ELECTRIC SIGN.

Application filed September 10, 1924. Serial No. 736,978.

*To all whom it may concern:*

Be it known that I, JOHN CLARENCE DANIEL, a citizen of the United States, residing at Winston-Salem, in the county of Forsyth and State of North Carolina, have invented new and useful Improvements in Rotating Electric Signs, of which the following is a specification.

This invention relates to display devices, particularly to signs, and has for its object the provision of a novel illuminated rotary sign so constructed and arranged as to be driven by wind power, the device being consequently extremely economical to operate.

An important and more specific object is the provision of a peculiar drive mechanism including a wind wheel having a rudder whereby to face the wind at all times, the wheel having a friction drive connection with the rotating sign.

An additional object is the provision of a device of this character which will be simple and inexpensive in manufacture, easy to install, positive in action, efficient and durable in service, and a general improvement in the art.

With the above and other objects and advantages in view, the invention consists in the details of construction and arrangement to be hereinafter more fully described and claimed, and illustrated in the accompanying drawings, in which:—

Figure 1:
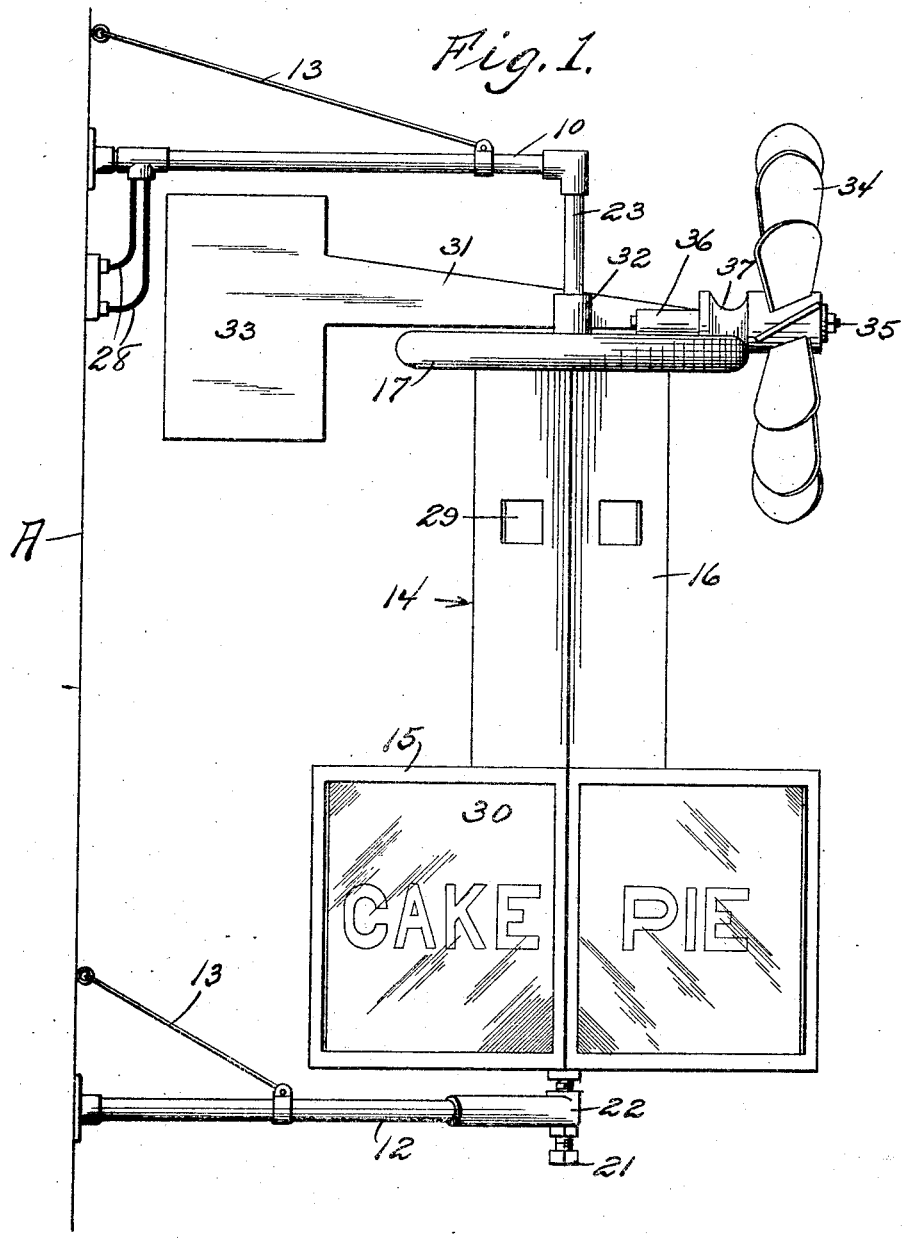
Figure 1 is a side elevation of the complete device.
Figure 2:
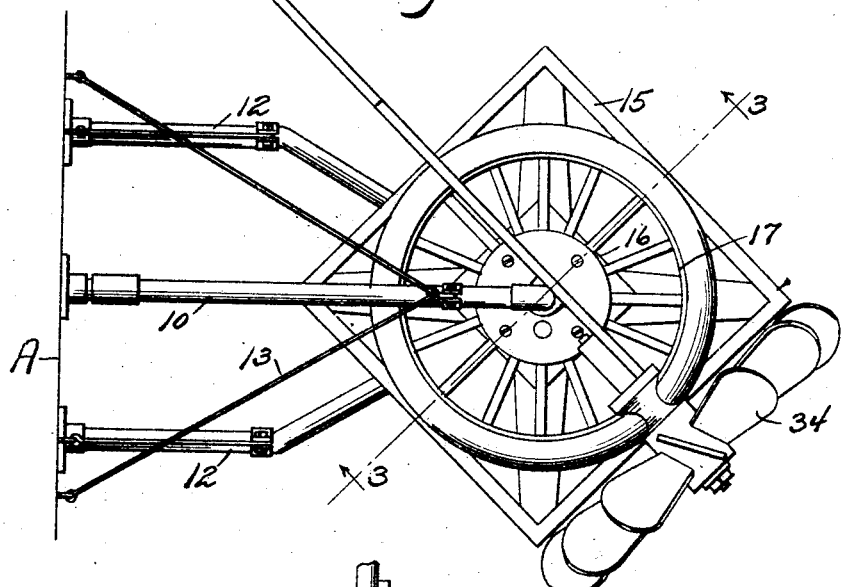
Figure 2 is a top plan view thereof.
Figure 3:
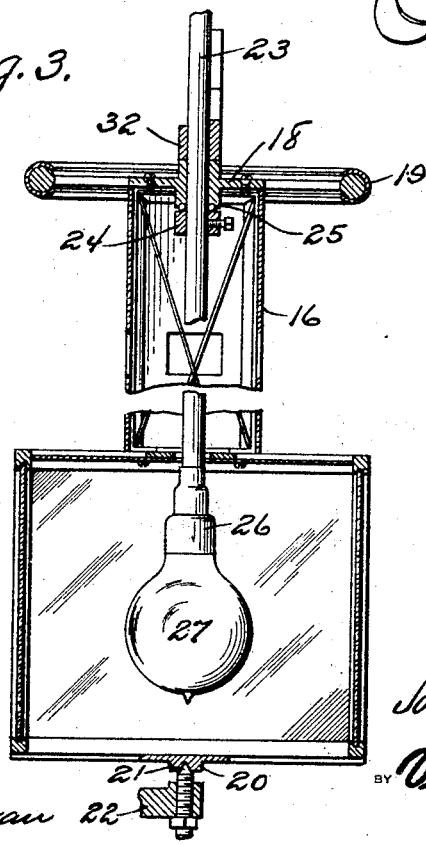
Figure 3 is a detail section with certain parts broken away and other omitted.

Referring more particularly to the drawings, I have shown my device as comprising a stationary frame or support including upper arms 10 and lower arms 12 which are suitably secured upon the side of a building or other object, indicated at A and which may be reenforced by braces or guys 13. In the present instance the bars forming these supports are represented as tubular though naturally there is no limitation in this respect.

The sign itself is designated broadly by the numeral 14 and it is here shown as including a relatively large rectangular lower portion 15 and an upstanding smaller portion 16 at the top of which is mounted a friction wheel 17 having a hub portion 18 forming a closure for the casing 16. The wheel is covered with elastic or other similar material 19 whereby to have strong traction. At the center of the casing section 15 is a bearing 20 resting upon the pointed end of a screw 21 which is passed upwardly through a bearing 22 at the outer end of the lower arm structure 12. Depending from the outer end of the member 10 is a pipe or tubular member 23 which extends entirely through the casing section 16 and terminates within the section 15. On this member is a collar 24 having a race receiving bearing balls 25 also engaged within a race in the lower face of the hub 18 for permitting free movement of the casing with respect to the pipe 23.

At the lower end of the member 23 is a suitable socket 26 within which is engaged an incandescent bulb 27 supplied with current by means of wires 28 which extend through the central one of the elements forming the upper support 10 and through the pipe 23. The casing section 16 is provided with openings 29 for the escape of air heated by this bulb. The sides of the casing section 15 are covered with panels 30 of glass or other transparent material prepared or cut in any desired manner to bear the proper legends or advertisements of any nature.

For driving the entire casing structure 14, I provide an arm 31 having a bearing 32 engaged upon the member 23. At one end this arm is formed into a rudder 33, while on the other end is journally mounted a wind wheel 34 which has its shaft 35 passing through a suitable bearing 36 secured or formed on the arm. Carried by the shaft 35 is a grooved friction roller 37 which engages upon the wheel 17.

In the operation it will be seen that the casing section 15 is illuminated by means of the bulb 27. Whenever a wind is blowing the wheel 34 will turn and the roller 37 engaging the wheel 17 will turn the latter and consequently the entire casing so that a very attractive display of the advertising matter will be made without the expense of an electric or other motor for furnishing the motive power.

While I have shown and described the preferred form of the invention, it is to be understood that I reserve the right to make such changes in the construction and arrangement as will not depart from the spirit of the invention or the scope of the subjoined claims.

Having described the invention, I claim:—

1. In a device of the character described, upper and lower stationary supports, a hollow member depending from the upper support, a casing journaled upon the lower support and rotatably mounted about said depending member, a friction wheel carried by said casing, an arm rotatably mounted on said depending member and carrying a rudder, a wind wheel journally supported by said arm, and a friction roller carried by the wind wheel engaging said friction wheel.

2. In a device of the character described, upper and lower stationary supports, a hollow member depending from the upper support, a casing journaled upon the lower support and rotatably mounted about said depending member, a friction wheel carried by said casing, an arm rotatably mounted on said depending member and carrying a rudder, a wind wheel journally supported by said arm, and a friction roller carried by the wind wheel engaging said friction wheel; said casing including upper and lower sections, the lower section carrying advertising matter.

3. In a device of the character described, upper and lower stationary supports, a hollow member depending from the upper support, a casing journaled upon the lower support and rotatably mounted about said depending member, a friction wheel carried by said casing, an arm rotatably mounted on said depending member and carrying a rudder, a wind wheel journally supported by said arm, and a friction roller carried by the wind wheel engaging said friction wheel; said casing including upper and lower sections, the lower section carrying advertising matter, and illuminating means mounted on said depending member and located within said lower section, said lower section having transparent portions.

4. A device of the character described comprising upper and lower horizontal supporting arms, a tubular conduit carried by the upper arm and extending toward the lower arm and containing current conducting wires, a socket carried by said conduit and carrying an incandescent bulb, a combined stop and bearing member on the conduit, a horizontally disposed wheel journally mounted upon the conduit and engaging upon said combined stop and bearing member, a tire on said wheel, a casing depending from the wheel and rotatable therewith in enclosing relation to said incandescent bulb, bearing means on the lower arms for supporting the casing, an arm journally mounted upon the conduit above the wheel and carrying a rudder, a windwheel on said arm and rotatable with respect thereto, and a friction roller carried by the wheel bearing upon said tire.

In testimony whereof I affix my signature.

JOHN CLARENCE DANIEL.